(12) United States Patent
Chatterjee et al.

(10) Patent No.: US 10,467,132 B1
(45) Date of Patent: Nov. 5, 2019

(54) VARIABILITY SYSTEM AND ANALYTICS FOR CONTINUOUS RELIABILITY IN CLOUD-BASED WORKFLOWS

(71) Applicant: INTUIT INC., Mountain View, CA (US)

(72) Inventors: Shreeshankar Chatterjee, Mountain View, CA (US); Poonguzhali Balasubramanian, Fremont, CA (US)

(73) Assignee: INTUIT, INC., Mountian View, CA (US)

( * ) Notice: Subject to any disclaimer, the term of this patent is extended or adjusted under 35 U.S.C. 154(b) by 231 days.

(21) Appl. No.: 15/597,125

(22) Filed: May 16, 2017

(51) Int. Cl.
- *G06F 11/36* (2006.01)
- *G06Q 10/06* (2012.01)
- *G06F 8/20* (2018.01)

(52) U.S. Cl.
CPC ..... *G06F 11/3692* (2013.01); *G06Q 10/0639* (2013.01); *G06F 8/20* (2013.01); *G06F 11/3612* (2013.01); *G06F 11/3676* (2013.01)

(58) Field of Classification Search
CPC ............ G06F 11/3692; G06F 11/3612; G06F 11/3676; G06F 8/65; G06Q 10/0639
See application file for complete search history.

(56) References Cited

U.S. PATENT DOCUMENTS

| | | | | |
|---|---|---|---|---|
| 8,701,092 B1* | 4/2014 | Colcord | ..................... | G06F 9/44 717/124 |
| 9,727,448 B1* | 8/2017 | Seibert, Jr. | ............ | G06F 11/368 |
| 2012/0030658 A1* | 2/2012 | Hu | ....................... | G06F 11/3688 717/131 |
| 2012/0101800 A1* | 4/2012 | Miao | ................... | G06F 11/3612 703/22 |
| 2014/0281732 A1* | 9/2014 | Elias | ................... | G06F 11/3692 714/38.1 |
| 2015/0039941 A1* | 2/2015 | Kalyanasundram | ......................... | G06F 11/3688 714/38.1 |
| 2016/0291970 A1* | 10/2016 | Mallisetty | ................. | G06F 8/71 |
| 2017/0039133 A1* | 2/2017 | Rai | ...................... | G06F 11/3688 |
| 2017/0052877 A1* | 2/2017 | Ganda | ................. | G06F 11/3664 |
| 2018/0101473 A1* | 4/2018 | Slivkins | .................. | G06F 9/451 |
| 2018/0121322 A1* | 5/2018 | Reyes | .................... | H04L 43/00 |
| 2018/0165184 A1* | 6/2018 | Cochran | ............. | G06F 11/3688 |
| 2018/0173608 A1* | 6/2018 | Paulraj | ................ | G06F 11/3612 |

\* cited by examiner

*Primary Examiner* — Yolanda L Wilson
(74) *Attorney, Agent, or Firm* — Patterson + Sheridan, LLP

(57) ABSTRACT

The present disclosure relates to automatically detecting software defects and determining the source of the defect. An example method generally includes receiving an output data set from a host server executing a test operation and comparing the output data set to a performance model. A test system identifies that a defect exists in software executing on the host server based on determining that the output data set deviates from the performance model by more than a threshold. The test system retrieves a source code update from a source code repository that was committed to the source code repository before the execution of the test operation. The test system compares a scope of the source code update to the defect and notifies a development team related to the source code update of the defect upon determining that the scope of the source code update and the defect match.

20 Claims, 5 Drawing Sheets

VARIABILITY SYSTEM AND ANALYTICS FOR CONTINUOUS RELIABILITY IN CLOUD-BASED WORKFLOWS

BACKGROUND

Field

Embodiments presented herein generally relate to quality control testing and defect detection in software applications, and more specifically to performing quality control testing concurrently on multiple software deployments.

Description of the Related Art

Commercial software is increasingly being provided using distributed architectures through public and private cloud computing environments to global customers. These software products can includes common programming subsystems and individualized program components for specific customers, markets, regions, etc. Commonly, developers work in teams devoted the creating and maintaining a single subsystem or individualized component. Thus, many development teams work in parallel to maintain the program, but with minimal inter-team communication. A problem with such distributed independent development teams is that defects can be introduced into the program when the individual teams each update the portion of the source code they are responsible for updating, maintaining, and developing.

The defects introduced by the independent updates often are not discovered until they degrade the performance of the production software, creating issues for customers and negatively impacting the customer experience. After the defect is discovered, developers need to locate the defect in one of the prior software updates before a correction can be made. Reviewing the numerous independent source code revisions is very labor intensive, requiring either a large number of developers to be devoted to the project or allowing the defect—with the associated customer issue—to persist for an extended period of time.

SUMMARY

One embodiment of the present disclosure includes a method for detecting and sourcing software defects. The method includes receiving an output data set from a host server executing a test operation in a software system. A test system compares the output data set to a performance model and identifies that a defect exists in software executing on the host server based, at least in part, on determining that the output data set deviates from the performance model by more than a threshold. The test system retrieves a source code update from a source code repository, wherein the source code update was committed to the source code repository before the execution of the test operation and compares a scope of the source code update to the defect. Upon determining that the scope of the source code update and the defect match, the test system notifies a development team related to the source code update that an error exists in the source code update.

Another embodiment provides a computer-readable storage medium having instructions, which, when executed on a processor, operates to detect and source software defects. The operation includes receiving an output data set from a host server executing a test operation in a software system. A test system compares the output data set to a performance model and identifies that a defect exists in software executing on the host server based, at least in part, on determining that the output data set deviates from the performance model by more than a threshold. The test system retrieves a source code update from a source code repository, wherein the source code update was committed to the source code repository before the execution of the test operation and compares a scope of the source code update to the defect. Upon determining that the scope of the source code update and the defect match, the test system notifies a development team related to the source code update that an error exists in the source code update.

Still another embodiment of the present invention includes a processor and a memory storing a program, which, when executed on the processor, performs an operation for detecting and sourcing software defects. The operation includes receiving an output data set from a host server executing a test operation in a software system. A test system compares the output data set to a performance model and identifies that a defect exists in software executing on the host server based, at least in part, on determining that the output data set deviates from the performance model by more than a threshold. The test system retrieves a source code update from a source code repository, wherein the source code update was committed to the source code repository before the execution of the test operation and compares a scope of the source code update to the defect. Upon determining that the scope of the source code update and the defect match, the test system notifies a development team related to the source code update that an error exists in the source code update.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
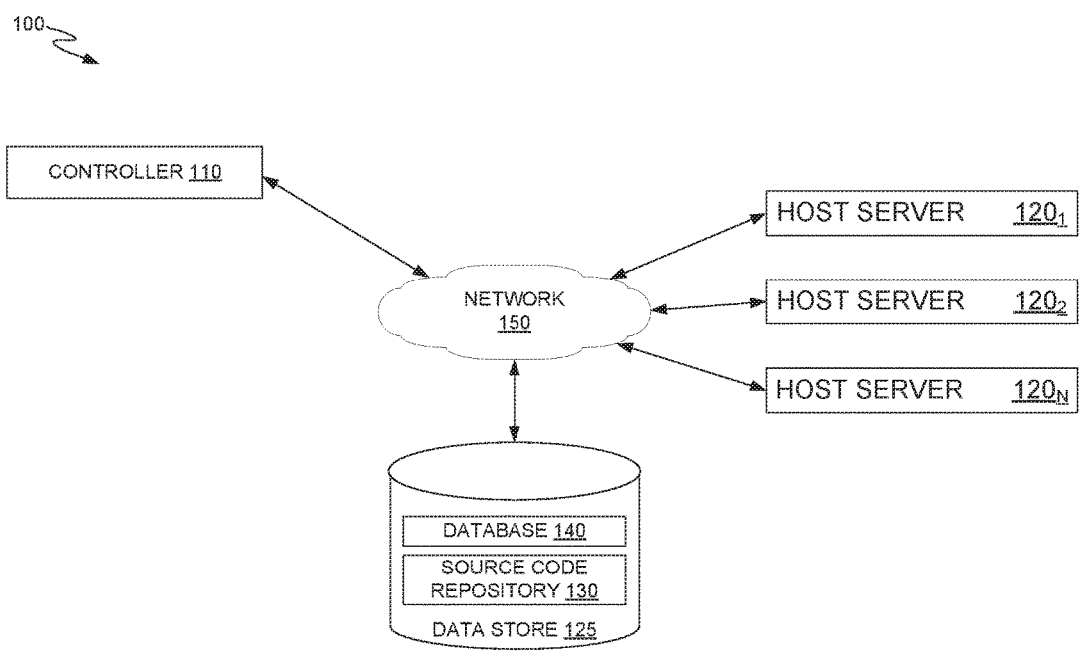
FIG. 1 illustrates an example system, according to an embodiment.

Generally, developers of commercial software applications can utilize a public cloud architecture to deliver continuous global access to software products. Applications deployed via a public cloud architecture often include many subsystems that work together to provide the services to users. In one example, a cloud-based application can serve separate user interfaces to users based, for example, on a location of the user. Each of these interfaces may implement region-specific variations on various features. For example, while generating invoices for purchase orders may use similar inputs, the generated invoices may differ based on tax regulations in different geographical regions. To allow users to generate invoices that comply with regional regulations, each regional interface can provide application functionality using region-specific processing rules and common subsystems that need not be region-specific.

Commonly, the individual components, or modules, of the software system are developed and maintained by separate teams that work concurrently and often with minimal inter-team coordination. These largely independent development teams allow developers to quickly add features or modify existing features in the software modules. However, the lack of centralized control and coordination between teams responsible for different components in a software system greatly increases the probability of a defect being released into the live software system that adversely affects customer reliability, performance, or both, as independent teams may not be able to fully test updates to individual software system components to identify problems that may result from interactions between existing software modules and the updated software module.

Software defects introduced by various development teams are generally difficult and time consuming to repair. First, the defect itself may not be immediately detected by developers, meaning that additional software updates to other or the same module can be committed to a code repository and deployed on a publically-available version of the software system before the original defect is detected. Once developers have discovered a defect in a previous version of a module, the task of manually evaluating the code to perform a root cause analysis is very time consuming, and implementing a repair can require close coordination between multiple development teams. Until a repair can be developed, tested, and deployed, the introduction of defects in a software system may negatively impact customers due to the degraded performance and reliability of the product. Further, because development teams may be reallocated from product development to debugging tasks, repairing defects in software systems may negatively impact product development due to the significant engineering resources that need to be diverted to perform a root cause analysis of the defect introduced into the software system and repair the identified source(s) of the defect.

Embodiments presented herein provide a system for detecting software defects in near-real time and automatically mapping the defects to the portion of the code base responsible for introducing the software defect into an application. The system maintains a performance baseline by periodically executing a set of test cases within the system and recording the performance information at each time period as well as contextual metadata documenting the state of the software system. Deviations from previous system performance may serve as a proxy for the identification of defects introduced into the software system, as it may be inferred that a large negative performance deviation from prior performance that coincides with one or more source code updates is indicative of a problem with the one or more source code updates.

FIG. 1 illustrates an example system 100, according to one embodiment. As shown, system 100 includes a controller 110 and one or more host servers 120, a datastore 125 that includes a source code repository 130, and a database 140, each of which communicate with each other via network 150.

Controller 110 periodically tests software applications deployed on one or more host servers 120 to identify the performance of the software applications and detect defects in the software applications based on deviations between prior performance and current performance of a test operation. To test a software application, controller 110 may be configured with different sets of test operations that controller can invoke on the one or more host servers 120. Each of the test operations may include, for example, information defining messages to be transmitted to the one or more host servers 120 to invoke an operation, parameters to include in the messages invoking the operation, and the like. In some cases, a definition of the test operations may include a sequence of operations that are to be performed by the one or more host servers 120. Each operation in the sequence of operations may be associated with a weighting indicating an importance of the operation and a maximum amount of time for the performance of the operation before controller 110 determines that the operation failed.

When controller 110 receives performance data from the one or more host servers 120, controller 110 can compare the received performance data to historical performance data and/or performance threshold information in a definition of a test operation to determine if the tested software application deployed on the one or more host servers 120 is working properly. If the received performance data deviates from historical performance data by an amount less than a threshold amount, or if the received performance data indicates that the completion time of the test operation complies with the threshold time defined for the operation, controller 110 can determine that the software application executing on the one or more host servers 120 is working properly. If, however, controller 110 determines that the received performance data deviates from historical performance data by an amount greater than the threshold amount of that the received performance data does not comply with the threshold time defined for the operation, controller 110 can determine that a problem exists in the software application deployed on the one or more host servers 120.

In some cases, when controller 110 detects that an execution time for one or more test operations exceeds a threshold time, controller 110 can examine an execution time trend to determine whether the failure to execute the test operation within the threshold time is a temporary failure or a persistent failure. A temporary failure, which may result in a number of testing failures followed by a number of successful executions of the test operation, may indicate, for example, a hardware failure causing one or more host servers 120 to temporarily go offline. In contrast, a persistent failure, which may result in a continuous number of testing failures, may indicate a code error introduced into the software application components executing on one or more host servers 120. If controller 110 detects a persistent failure in one or more components of a software application executing on one or more host servers 120, controller 110 can examine the historical performance data of the test operations to identify a time at which the problems initially appeared in the performance data of the one or more host servers 120. Based on the initial appearance time of performance problems in the software application, controller 110 can examine a code repository (e.g., source code repository 130) for code commits that occurred before the initial appearance of a problem in committed and deployed source code (e.g., the code commit that occurred immediately before the initial appearance of the problem).

Upon identifying the one or more code commits that occurred around the time at which degraded performance at the host servers 120 initially occurred, controller 110 can identify the one or more development resources responsible for the code commit that is likely to be the cause of the problems experienced during testing. A development resource may include a development team having a designated contact person, an automated troubleshooter, or other development resources that can rectify errors detected in program source code. In some cases, controller 110 can generate an e-mail or other electronic message to be sent to a designated contact person for the code commit that was determined to be the likely cause of the degraded performance at the one or more host servers 120. In some cases, controller 110 can identify the previous working version of the software in source code repository 130 (e.g., the source code associated with the code commit that occurred immediately before the source code commit that was determined to be the cause of the problem). Controller 110 can subsequently roll back the software deployed on the one or more host servers 120 to the previous working version until the debugging team fixes the error and commits a patched version of the software to source code repository 130.

The one or more host servers 120 provide software to a global customer base by executing a number of software modules that function together to provide a complex set of software features for numerous region specific instances of the software. For example, host servers 120 can provide distinct user interfaces for specific countries, such as distinct user interfaces for France, Spain, and the United States. Each country-specific interface can have a dedicated software module for applying country specific rules, such as accounting practices, performing tax calculations, and the like, as well as rely on common software modules, such as communicating with third party application or accessing databases that store system-wide information. As discussed above, the combination of dedicated and common software modules can cause a change in one module to affect many different customer groups.

Source code repository 130 stores the source code files that constitute the software modules being executed by host servers 120, and tracks and stores different versions of the source code files as they are updated by developers. That is, each code module versioned as it is stored in the code repository 130, and each time a development team commits an update to the code repository 130, the version for the code module is incremented and the date and time of the update are recorded. Database 140 stores performance results and contextual metadata created by controller 110 during operation of the system 100.

Figure 2:
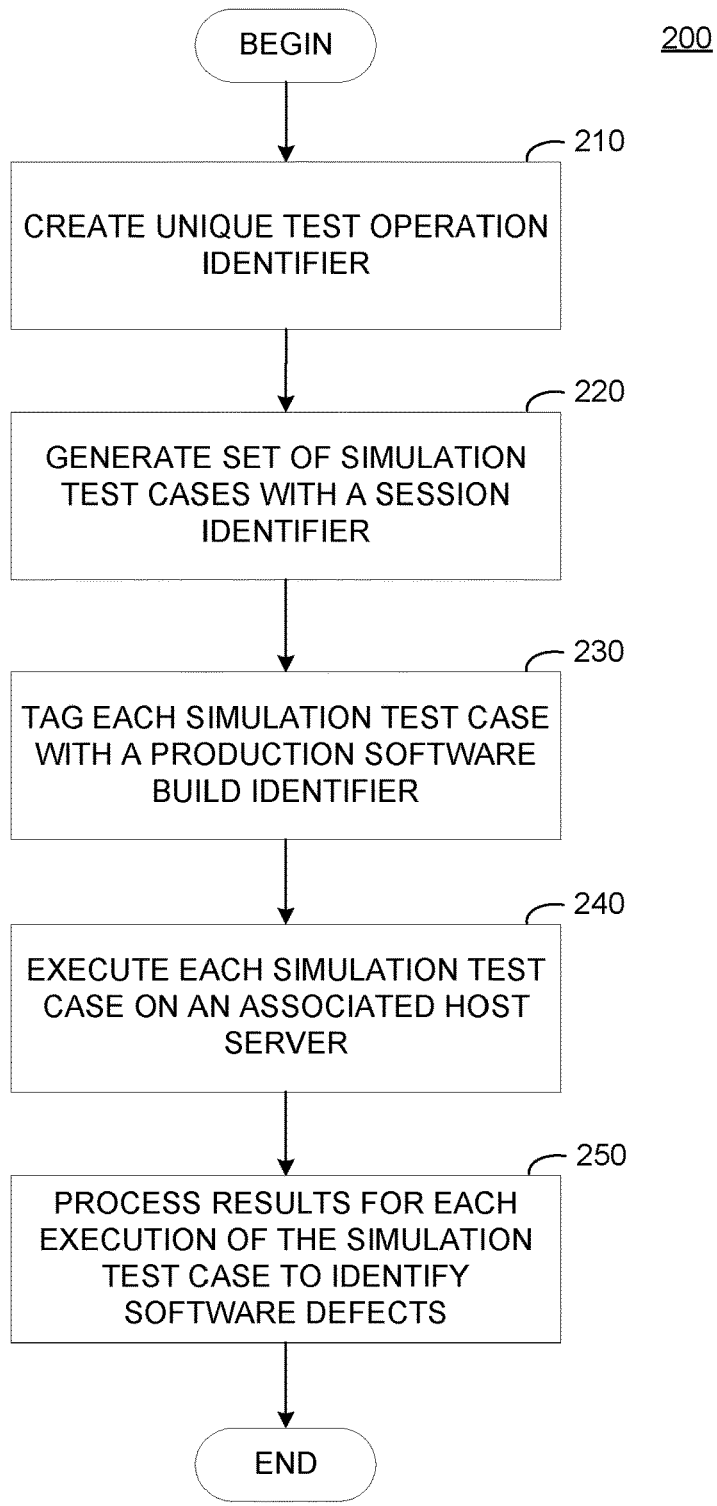
FIG. 2 is a flow chart illustrating a process for generating and processing simulation cases to document system performance, according to an embodiment.

FIG. 2 is a flowchart illustrating operations 200 that may be performed by a controller 110 to test software modules deployed on one or more host servers 120 and evaluate the performance of the software modules deployed on the one or more host servers 120, according to an embodiment.

As illustrated, operations 200 may begin at step 210, where controller 110 creates a new instance of a test operation to be performed on the one or more host servers 120. The test operation may be generated using a test plan that includes a test operation identifier, a software build number, a test case context, and an execution plan. The test operation identifier may identify the specific test operations being performed. The test case context generally describes how test cases are to be divided and processed. For example, the test case context may specify that the execution of the operations specified in the test operation are to be executed in parallel and distributed across host servers 120 that provide the software application to customers in different geographic regions.

At step 220, controller 110 generates the set of simulation test cases for the test case context, including a session ID that uniquely identifies the specific test set being run. At step 230, controller 110 adds a production software build ID to each simulation case that records the version of the software that the simulation case will be executed within.

At step 240, controller 110 initializes each test case on a host server 120 according to the test case context. Each host server 120 runs the test cases assigned to it, and produces a result data set. The individual test cases from the set of test cases can be executed across a group of host servers 120 or on a single host server 120, depending on the test case context.

At step 250, controller 110 receives the result data set from each host server 120 that executed a test simulation, and processes the results to generate a score for each simulation and to aggregate the results into an output data set.

The output data set includes metadata describing the context of the test operation, the score, statistics related to the test operation, and time series statistics describing how long the test simulations took to execute. The time series information for each test simulation is generated by the host server 120 that executes the simulation, and controller 110 aggregates the individual time series data together for the test operation. The output data set for each test operation is stored in database 140 by controller 110. Controller 110 periodically executes the number of test operations, each of which generate an output data set, and analyzes the collection of output data sets in database 140 to provide a near-real time visualization of the software performance.

Figure 3:
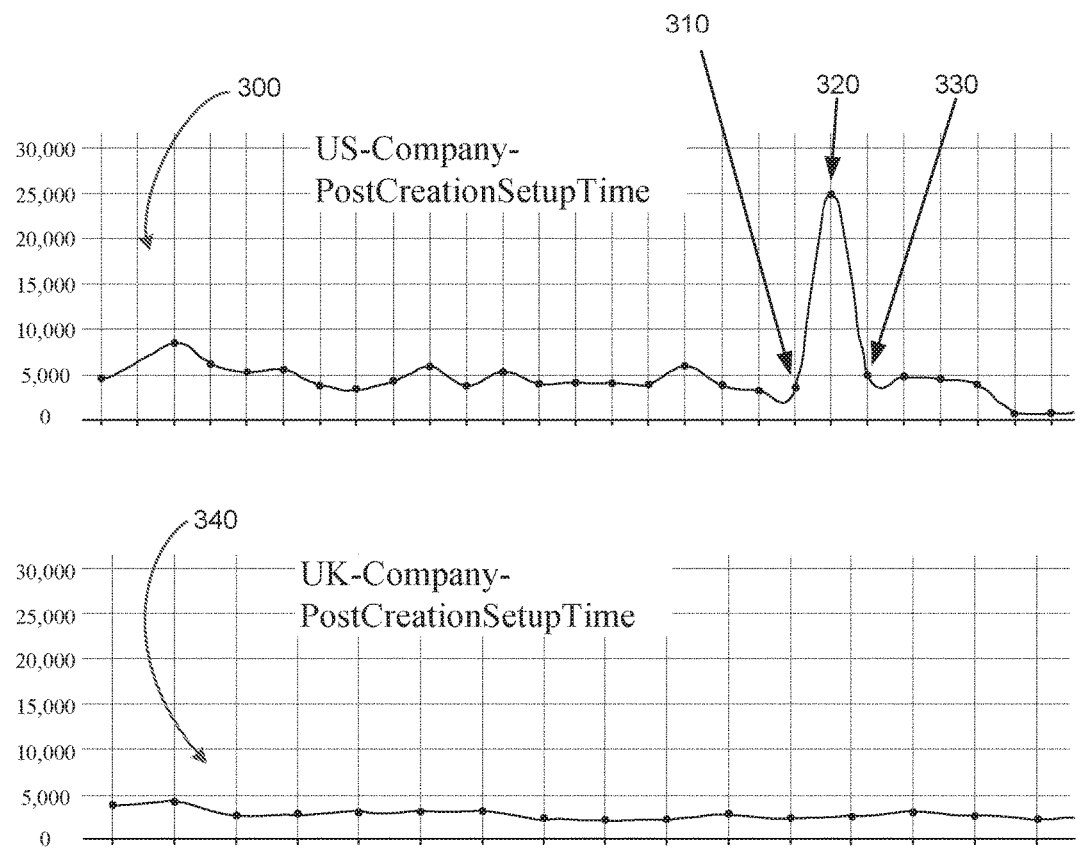
FIG. 3 is graph illustrating a software defect, according to an embodiment.

FIG. 3 illustrates an example visualization of system performance over time generated by controller 110, according to an embodiment. The visualization of system performance may include a plurality of graphs, with each graph representing a performance metric for a particular variation of the software system deployed on a host server 120. For example, as illustrated in FIG. 3, the visualization generated by controller 110 may include a first graph 300 illustrating the set-up time for US based Companies and a second graph illustrating the set-up time for United Kingdom-based companies. Controller 110 creates the first graph by retrieving output data sets for a test operation designed to set up a company in a United States-specific version of the software application. Each point in the first graph represents the set-up time from a different output data set, arranged as a timeline. As shown, the set-up time increased substantially for point 320 as compared to points 310 and 330. FIG. 3 also includes a second graph 340 illustrating the set-up times for United Kingdom based companies created by retrieving output data sets for a test operation designed to set up a number of companies in the United Kingdom-specific version of the software application. Graph 340 and 300 represent approximately the same time period. The visualization generated by controller 110 can include additional test operation results in a stacked or layered manner to depict the overall time taken for the combined test operations as well as the individual contributions for each test operation.

Controller 110 can also generate, as a separate visualization or accompanying the graph in FIG. 3, a visual indicator of the score of individual software modules or regional instances. For example, the US and UK regions graphs 300, 340 in FIG. 3 could have each point depicted as a real-time representation of the state of that system, where the results of the most recently run test operations are indicated with a color, value, or both representing the state. A state representation for the time just after point 310 would indicate both the US and UK regions operating as expected using, for example, a block of green color next to the region. After the tests run at point 320 the indicator for the US region would turn red, indicating that the controller 110 had detected degradation in system performance indicative of a problem with the software.

The output data set for each test operation uses a structured data format for all test operations to unify the data. The structured data includes, for example, metadata describing the software build/version that the test was run on, metadata defining the use-case that was tested, and monitoring metrics. The use-case metadata, for instance, includes the geographic region being tested, the number and type of operations executed, such as how many records are created/modified and each step of the process. The monitoring metrics include the response time for each operation and error rates. Controller 110 uses the information in the output data set to derive a score for the individual test operations, which may be used to identify degraded performance in a software system and the one or more source code modules that are likely to have caused the degraded performance.

Controller 110 derives the score for individual test operations by comparing the performance of the current test operation to the performance of prior test operations. For instance, controller 110 can assign a score based at least in part on predetermined performance thresholds identified by developers, i.e., 10-20 milliseconds scores highest, 20-30 milliseconds is acceptable, and 40+ milliseconds is a failure. Controller 110 can also assign a score by applying a statistical analysis of the test operation, such as, for example, comparing the test operation to the average or median times for prior operations. Controller 110 can apply a polynomial regression to a set of early test operation outputs to establish a performance model and score the current test operation using the deviation from the performance model. Similarly, controller 110 can use running averages and standard deviations to score a test operation result. Controller 110 can combine these individual techniques as well as use them with rules defining priority or relative weight, or both. For example, a test operation with three steps—create a company entity, assigning the company a not-for-profit tax status, and linking the entity to a third party payroll provider—could have rules for scoring the operation that emphasize particular steps in the test operation. For instance, a rule could assign a low score because the initial step of creating the company entity fell outside acceptable time thresholds, regardless of what happened in the following steps. In another example, a rule may specify that the first step be assigned ⅔ of the score weight, while the remaining two steps account for only ⅓ of the score. Thus, developers can tailor the score calculation to give an accurate reflection of system performance.

Figure 4:
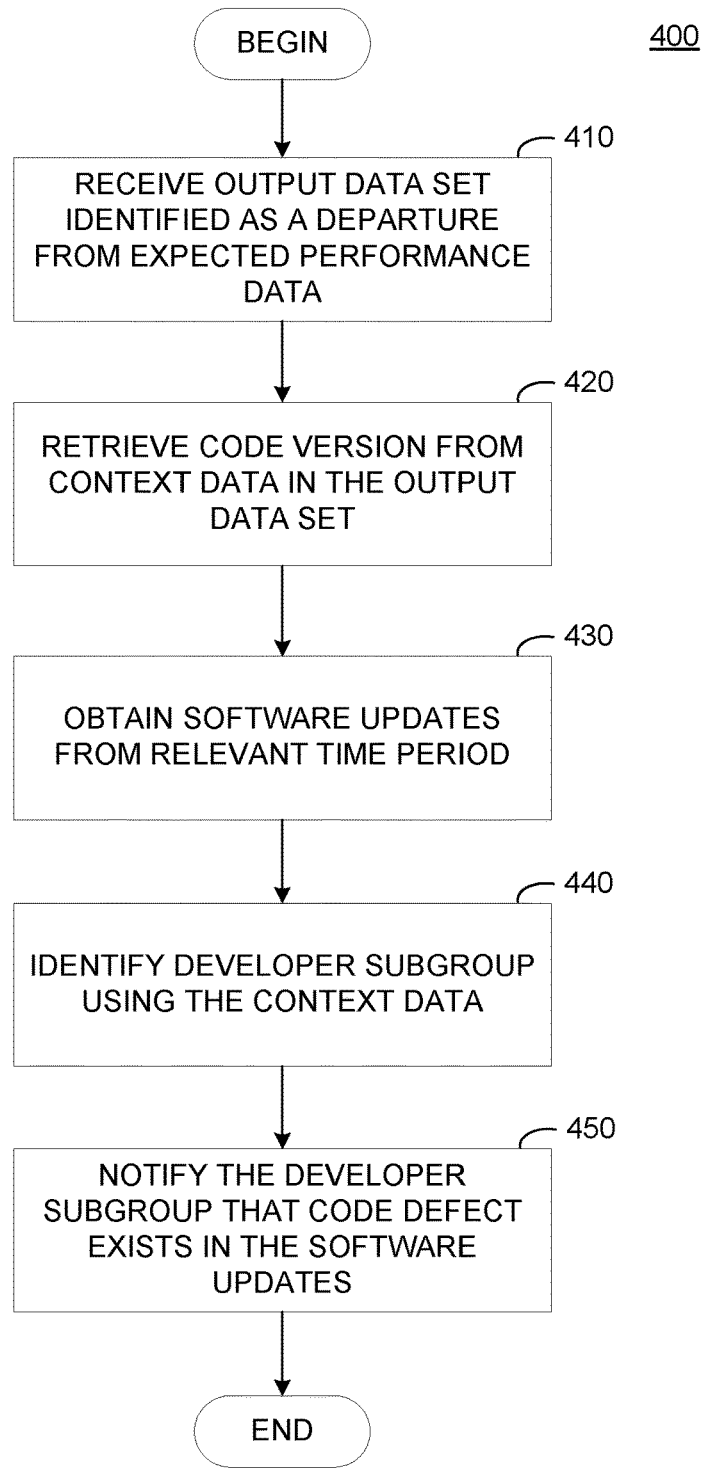
FIG. 4 is flow chart illustrating a process for identifying the source of a software defect, according to an embodiment.

After controller 110 has detected a performance change representing a defect in the code operating on the host servers 120, controller 110 automatically performs a root cause analysis (RCA) to identify the source of the defect within the source code. FIG. 4 illustrates a process for identifying the cause of a defect, according to an embodiment. As shown, controller 110 begins the process 400 at step 410 by retrieving from database 140 the output data set identified during analysis of the output data sets as departing from expected operations and the output data set predating the identified output data set. At step 420, controller 110 accesses the context data of the output data set to determine the version of the software running at the time the output data set was created. At step 430, controller 110 retrieves the source code updates logged into source code repository 130 between the time that the identified output data set was created and the time the prior output data set was created. This window may be defined as the time period when a new software update responsible for the defect was added to the production code. After controller 110 has received the one or more software updates, at step 440, controller 110 determines which software update is the source of the defect by comparing the scope of the defect to the responsibilities for each development group that submitted a code update.

For example, the output data set for point 320 in FIG. 3 indicated a defect in the US region for the process of creating companies, but no similar defect was detected in the same process for the UK region. Controller 110, therefore, compares the responsibilities of the development groups who made a software update in the relevant time period with the scope of the defect. That is, controller 110 determines whether the software modules that received an update in the relevant time period are executing on the host server 120 identified as being affected by the code defect. If so, the code module that is both executing on the identified host server 120 and received a code update is identified as responsible for the defect. Source code repository 130 includes metadata identifying the individual developer who commits each update to the code, and controller 110 uses the metadata to alert the responsible person.

In the example, the defect would be linked to an update from the US development group because the defect was limited to the US host server 120, not the UK development group. If the UK had also experienced a defect, then controller 110 would seek a software module form development group with a broader scope, such as a module responsible for maintaining a system wide company profile database. At step 450, controller 110 notifies the development group identified of the defect and the associated code update. In cases where only a single code update has been logged in the time between the two output data sets, controller 110 assigns the defect to the development team responsible for that single code update without needing to evaluate the scope of development team responsibility. As discussed above, controller 110 may, in some cases, assign the defect to another development resource, such as an automated troubleshooter, to rectify the detected defect.

Thus, controller 110 automatically detects and attributes code defects in near real time using the changes in system performance. The frequency that the controller 110 runs each test operation impacts both how quickly a defect is discovered and the potential number of source code updates that need to be evaluated. Controller 110, therefore, can vary the frequency of each test operation to prioritize some software subsystems over other subsystems. For example, critical subsystems that provide services to many or all customer groups/regions can have test operations run more frequently than other subsystems that provide non-essential services. As another example, each development team could set a relatively high frequency for test operations for the team's subsystem for a limited time before and after introducing a new software update. The increased frequency would allow controller 110 to quickly identify defects and notify the development team. Thus, the development team would be proactively debugging the update by reducing the time to fix any potential defects. After the software update had executed for a satisfactory amount of time, the development team could reduce the test operation frequency. In an embodiment, controller 110 includes a set of test operations from each development team that is periodically executed ensure proper functionality of each development team's code.

In another embodiment, controller 110 includes a set of test operations to evaluate the provisioning of system resources to specific regional customers. For example, controller 110 can include test operations designed to provide the same software service from host servers 120 physically located in different geographic areas. Controller 110 can use the results such a test operation to identify optimal host severs 120 for specific software subsystems. Controller 110, therefore, allows each development team to independently balance the additional processing demands imposed by the test operations against the likelihood of a code defect being present.

Figure 5:
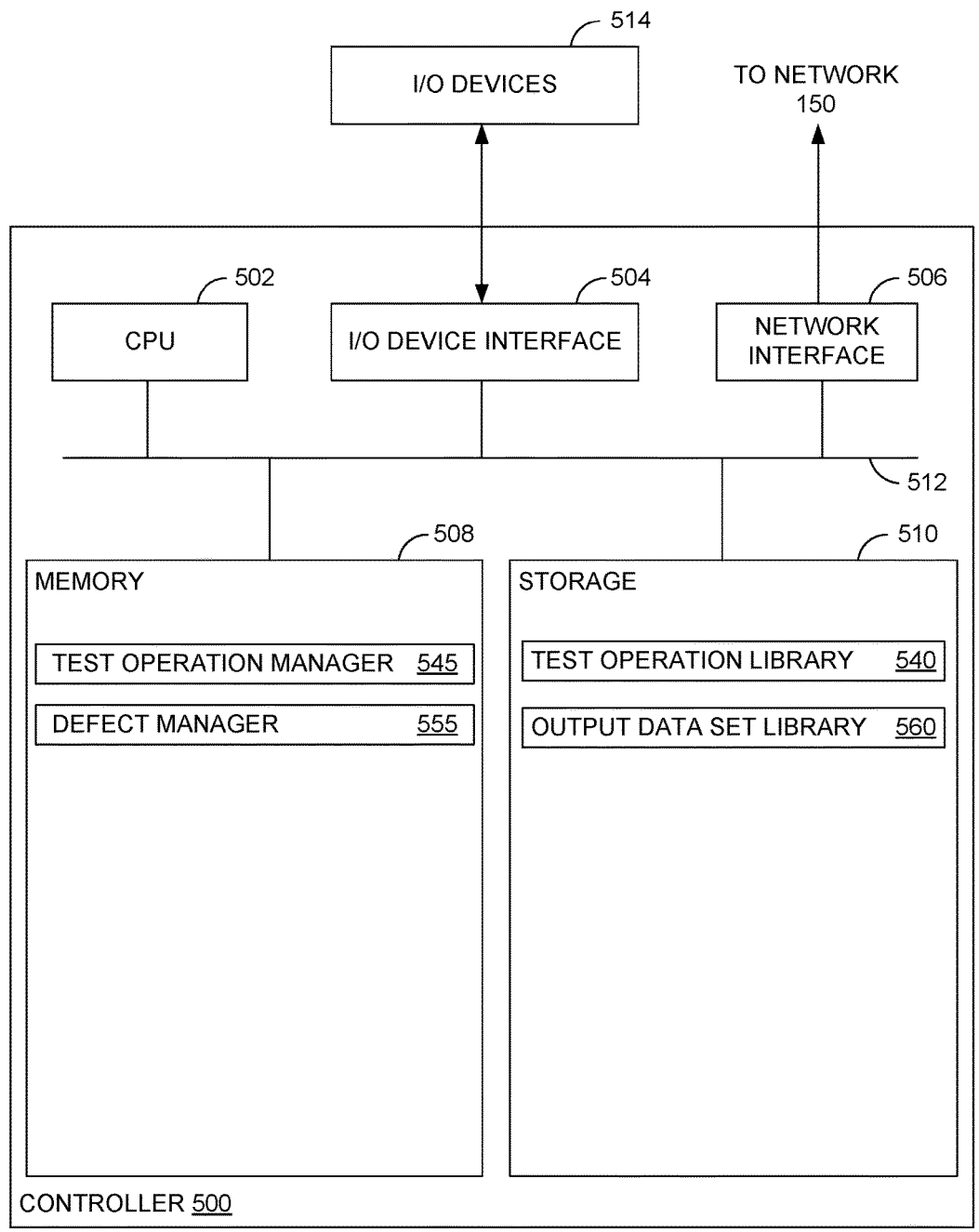
FIG. 5 illustrates an example computing system for identifying and sourcing software defects, according to an embodiment.

FIG. 5 illustrates an example computing system for performing automated testing of software modules deployed on one or more host servers to identify performance degradation in software modules and the source code commit(s) that likely caused the degraded performance on the one or more host servers. As shown, the controller 500 includes, without limitation, a central processing unit (CPU) 502, one or more I/O device interfaces 504 which may allow for the connection of various I/O devices 514 (e.g. keyboards, displays, mouse devices, pen inputs, etc.) to controller 500, network interface 506, a memory 508, storage 510, and an interconnect 512.

CPU 502 may retrieve and execute programming instructions stored in the memory 508. Similarly, the CPU 502 may retrieve and store application data residing in memory 508. The interconnect 512 transmits programming instructions and application data, among the CPU 502, I/O device interface 510, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a test operation manager 545 configured to retrieve and execute test operations from test operation library 550 in storage 510. Test operation manager 545 communicates with host servers 120 via network interface 520 to initialize each test operation and to receive the output data set generated from each test operation. When test operation manager 545 receives an output data set from a host server 120, test operation manager 545 stores the output data set in output data set library 560, and in database 140 via network interface 520. Output data set library 560 acts as local storage for output data sets used by defect manager to generate visualizations, detect defects in the production code, and identify the root cause of a defect. Defect manager 555 accesses output data sets from output data set library 560, database 140, or both, to score individual test operations and analyze a current test operation to identify defects. Defect manager 555 applies statistical analysis to the current output data set based on similar prior output data sets to identify deviations in software performance that indicate a defect has been introduced into the code. Once a defect has been detected defect manager 555 uses the context data of the current output data set to retrieve software updates checked into source code repository 130 preceding the execution of the current test operation. Defect manager 555 compares the one or more software updates to the software subsystems experiencing the defect, and associates the defect with the software update whose scope most closely matches the performance defect. After associating the defect with a software update, defect manager 555 notifies the development team responsible about the defect and the associated software update.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for detecting and sourcing software defects comprising:
receiving an output data set from a host server executing a test operation in a software system;
comparing the output data set to a performance model;
identifying that a defect exists in software executing on the host server based, at least in part, on determining that the output data set deviates from the performance model by more than a threshold;
retrieving a source code update from a source code repository, wherein the source code update was committed to the source code repository before the execution of the test operation;
comparing a scope of the source code update to the defect; and
notifying a development resource related to the source code update of the defect upon determining that the scope of the source code update and the defect match.

2. The method of claim 1, further comprising:
generating a visualization including the performance model and the output data set; and
displaying the visualization to a user.

3. The method of claim 2, wherein generating the visualization comprises generating performance data graphs for a plurality of subsystems of the software system, wherein each performance data graph illustrates the performance model and the output data set for a specific subsystem of the plurality of subsystems.

4. The method of claim 1, wherein the performance model is based, at least in part, on performance data captured in a plurality of prior output data sets.

5. The method of claim 1, wherein the output data comprises a score weighing performance of each of a plurality of subsystems of the software system, and wherein identifying that the defect exists comprises determining that the score differs from a threshold score defined by the performance model by a threshold amount.

6. The method of claim 1, further comprising:
identifying a second source code update deployed prior to a commit date of the source code update; and
deploying the second source code update to the host server.

7. The method of claim 1, wherein the output data set includes metadata describing a software version that the test operation was executed in, metadata defining operations performed as part of the test operation, and metadata recording a response time for each operation.

8. A system, comprising:
a processor; and
memory storing instructions which, when executed on the processor, perform an operation for detecting and sourcing software defects, the operation comprising:
receiving an output data set from a host server executing a test operation in a software system;
comparing the output data set to a performance model;
identifying that a defect exists in software executing on the host server based, at least in part, on determining that the output data set deviates from the performance model by more than a threshold;
retrieving a source code update from a source code repository, wherein the source code update was committed to the source code repository before the execution of the test operation;
comparing a scope of the source code update to the defect; and
notifying a development team related to the source code update of the defect upon determining that the scope of the source code update and the defect match.

9. The system of claim 8, the operation further comprising:
generating a visualization including the performance model and the output data set; and
displaying the visualization to a user.

10. The system of claim 9, wherein generating the visualization comprises generating performance data graphs for a plurality of subsystems of the software system, wherein each performance data graph illustrates the performance model and the output data set for a specific subsystem of the plurality of subsystems.

11. The system of claim 8, wherein the performance model is based, at least in part, on performance data captured in a plurality of prior output data sets.

12. The system of claim 8, wherein the output data comprises a score weighing performance of each of a plurality of subsystems of the software system, and wherein identifying that the defect exists comprises determining that the score differs from a threshold score defined by the performance model by a threshold amount.

13. The system of claim 8, further comprising:
identifying a second source code update deployed prior to a commit date of the source code update; and
deploying the second source code update to the host server.

14. The system of claim 8, wherein the output data set includes metadata describing a software version that the test operation was executed in, metadata defining operations performed as part of the test operation, and metadata recording a response time for each operation.

15. A non-transitory computer-readable medium comprising instructions which, when executed by one or more processors, performs an operation for detecting and sourcing software defects, the operation comprising:
receiving an output data set from a host server executing a test operation in a software system;
comparing the output data set to a performance model;
identifying that a defect exists in software executing on the host server based, at least in part, on determining that the output data set deviates from the performance model by more than a threshold;
retrieving a source code update from a source code repository, wherein the source code update was committed to the source code repository before the execution of the test operation;
comparing a scope of the source code update to the defect; and
notifying a development team related to the source code update of the defect upon determining that the scope of the source code update and the defect match.

16. The non-transitory computer-readable medium of claim 15, wherein the operation further comprises:
generating a visualization including the performance model and the output data set; and
displaying the visualization to a user.

17. The non-transitory computer-readable medium of claim 16, wherein generating the visualization comprises generating performance data graphs for a plurality of subsystems of the software system, wherein each performance data graph illustrates the performance model and the output data set for a specific subsystem of the plurality of subsystems.

18. The non-transitory computer-readable medium of claim 15, wherein the performance model is based, at least in part, on performance data captured in a plurality of prior output data sets.

19. The non-transitory computer-readable medium of claim 15, the output data comprises a score weighing performance of each of a plurality of subsystems of the software system, and wherein identifying that the defect exists comprises determining that the score differs from a threshold score defined by the performance model by a threshold amount.

20. The non-transitory computer-readable medium of claim 15 further comprising:
- identifying a second source code update deployed prior to a commit date of the source code update; and
- deploying the second source code update to the host server.

* * * * *